United States Patent Office 2,762,710
Patented Sept. 11, 1956

2,762,710

PROCESS OF PREPARING LACTATED SUGARS

Harold E. Bode, Chicago, Ill.

No Drawing. Application January 31, 1955,
Serial No. 485,355

3 Claims. (Cl. 99—142)

My invention relates to a lactated corn syrup. In a broader sense, my invention relates to lactated, low moisture, sugar solutions.

One object of the invention is to obtain a dilute lactic acid solution of high viscosity and high food value.

Another object of the invention is to provide means for applying lactic acid and sugar with a minimum of corrosion and handling problems.

Still another object is to provide improved means for transporting lactic acid with a minimum of water content.

Under present commercial practice, lactic acid is manufactured by fermenting a dilute sugar solution, subjecting the resulting crude dilute lactic solution to a refining and isolation procedure and, finally, vacuum concentrating to an aqueous lactic acid solution containing either 22, 44, or 80 per cent lactic acid.

If a lactic acid of very high purity is desired, it is necessary to resort to the long and expensive process of crystallizing the lactic acid from solutions in the form of calcium lactate and subsequently obtaining the free lactic acid by removing the calcium with sulphuric acid. Another method sometimes used for obtaining high purity lactic acid is to remove the lactic acid from its aqueous solution by means of organic solvents and subsequently remove the said solvent.

The refined, concentrated lactic acid liquor obtained by the above described expensive commercial processes is rarely used in a concentrated form when applied to industry. In the large majority of commercial lactic acid uses, the acid is applied in a dilute aqueous form. In most cases the lactic acid is used in an aqueous concentration smaller than the concentration which commonly prevails in the original crude lactic acid liquor before refining and pan concentration.

When a consumer applies lactic acid in his plant, he proceeds, in most cases, to dilute the concentrated aqueous lactic acid liquor purchased to a lactic acid content below the lactic acid concentration of the crude lactic fermented ten Brix sugar liquor obtained in the manufacture of lactic acid. In addition to this, most commercial lactic acid uses involve the application of lactic acid in conjunction with, or in the presence of, sugar.

In accordance with this invention, I provide means for obtaining a lactic acid-sugar solution mixture under conditions wherein the cost of isolating lactic acid is decreased and the cost of refining a crude lactic acid liquor is minimized. I accomplish these objectives by subjecting a sugar liquor to a lactic acid fermentation under conditions wherein only a portion of the sugar is converted to lactic acid. Since the refining of a crude lactic acid liquor involves processing steps similar to those applied in the refining of sugar liquors, I decrease lactic acid refining costs with my process by starting with crude or semi-refined sugar liquors. By starting with such raw material, partially converting to lactic acid, and subsequently subjecting the resulting crude sugar and lactic acid liquor to the usual sugar refinery refining steps, such as carbon treatment, filter cell, etc., the lactic acid is being refined during the same time and with the same material that the sugar refinery uses for the manufacture of refined sugar.

With the above process, it is possible to obtain a lactic acid product whose lactic acid content costs much less than the lactic acid of commerce. The reasons for this are the drastic reduction in the amount of water which has to be removed per unit of concentrated lactic acid, the elimination of a separate carbon or filter cell refining unit for the lactic acid, and, for high purity lactic acid, the elimination of the need for isolating pure lactic acid by means of multiple calcium lactate recrystallizations.

In the past, the food market for edible lactic acid has been severely limited by the high cost of this product. It has long been known that, in food technology, lactic acid has many superior qualities to its competing edible acids, such as phosphoric or acetic acids; but the cost of lactic acid in the past, on a 100 per cent basis, has always been three to five times as high as phosphoric or acetic acid. This situation has prevailed in spite of the fact that the raw material used for lactic acid manufacture, namely, sugar, has always been low in cost and that the yields of lactic acids from sugars are high, namely, over 80 per cent.

With the lactated sugar solution process of my invention, it becomes possible to reduce the manufacturing costs to a point where the cost to the consumer of lactic acid would be competitive with that of phosphoric or acetic acids, thereby greatly expanding the market potential for lactic acid.

Another important advantage with the process of my invention is the minimizing of the lactic acid corrosion factor. In the commercial lactic acid procedure of the past, the production of either 22, 44, 50, or 80 per cent lactic acid solutions and the transportation of such solutions involves complex and costly corrosion problems, the avoidance of which necessitates expensive shipping equipment. The products produced in accordance with the process of this invention contain lactic acid in the presence of a major amount of sugar dry substance. In my product, the lactic acid is dissolved in a sugar solution instead of in plain water.

In commercial liquid sugar products such as corn syrup or invert sugar syrups, the lactic acid, in accordance with my process, is dissolved in the same water which is used to dissolve or disperse the sugar. Thus in the case of a 42 Bé. corn syrup liquor, the syrup contains 18 lbs. of water and 82 pounds of sugar dry substance per 100 pounds of corn syrup. In the product which I produce, the same 18 pounds of water contain the lactic acid obtained by transforming a part of the corn syrup sugars to lactic acid. I have found that, for the same amount of water, a given amount of lactic acid will produce an aqueous solution which is considerably less corrosive when this water is used simultaneously as a sugar and lactic acid solvent.

Thus if in 100 pounds of corn syrup, 20 pounds of its sugar content is converted to 20 pounds of lactic acid, the resulting lactated corn syrup will be less corrosive than a lactic acid solution produced by dissolving 20 pounds of lactic acid into 18 pounds of water.

The following examples will specifically illustrate the invention and disclose some of the advantageous uses to which such lactated sugar products can be supplied.

*Example 1*

A 22 Bé. starch suspension was acidified with hydrochloric acid to 1.7 pH and converted in an autoclave at 150° C. until the dry substance in the aqueous starch suspension was converted to a converter liquor containing 22 percent dextrose, 21 per cent maltose, and 57 per cent of complex polysaccharides of the dextrin type. The converter liquor was removed from the pressure cooker and transferred to a neutralizing tank wherein sufficient soda ash was added to adjust the pH to 4.8. The neutralized and substantially sterile or pasteurized liquor was centrifuged to remove the liberated fatty acid and other colloidal starch impurities. The centrifuged liquor was diluted with sterile warm water to a sugar-dry substance content of 10 per cent and the entire batch cooled to 123° F.

There was added an amount of nutrient protein material equivalent to 12 per cent of the sugar dry substance, and the batch was then inoculated with a Delbrueckii type of lactic acid microorganism obtained from sour milk in accordance with the usual procedure known to the art. The batch was then allowed to ferment at 123° F. for twelve hours or until twenty per cent of the sugar dry substance had been converted to lactic acid. During this fermentation period, slaked lime was added incrementally in sufficient amount to maintain the acidity of the batch below 0.5 per cent. The liquor was then treated with a sufficient amount of sulfuric acid to precipitate the calcium and liberate the lactic acid.

The resulting mixture of sugars, dextrins and lactic acid, together with suspended calcium sulfate and other insolubles, was heated to 170° F., filtered, and the dry substance in the resulting filtrate consisted of 20 per cent lactic acid, 14 per cent dextrose, 13 per cent maltose, and 53 per cent dextrins. This liquor was then subjected to the same kind of a refining treatment as that ordinarily given to a filtered, crude sugar liquor such as crude, filtered and dilute regular corn syrup neutralizer liquor.

The refining treatment consists of multi-stage vacuum concentration coupled with multi-stage filter cell and carbon decolorizing treatments. In the final stage, the light, carbon decolorized liquor is vacuum concentrated to a point wherein the syrup contains 18 per cent moisture. The lactated corn syrup produced in accordance with the above example contained 18 per cent moisture and 16 per cent lactic acid, 22 per cent mono and disaccharides and 44 per cent dextrins.

The above lactated corn syrup is superior in many respects to a mere mechanical mixture of corn syrup and lactic acid. The replacement of some of the sugars in the corn syrup with lactic acid during the fermentation, produces a product wherein the dextrins in the corn syrup are present in a relatively higher proportion. This results in the production of a product wherein the body and viscosity are greater than is the case of a mere mechanical mixture of corn syrup and lactic acid. This has certain advantages in such food products as jellies, gelatin desserts and certain confections wherein edible acids are part of the confection.

*Example 2*

A 22 Bé. starch liquor was treated with hydrochloric acid in a pressure cooker under the same corn syrup converting conditions as outlined in Example 1 and subjected to the same kind of subsequent lactic acid fermentation, with the exception that the lime neutralization of the lactic acid was eliminated. In place of this, the fermentation was allowed to proceed until a lactic acid acidity of 2 per cent had developed. The dilute, approximately 10 Brix liquor, was then subjected to the same refining and concentrating steps as that described in Example 1.

*Example 3*

A 12Bé. aqueous starch liquor was treated with hydrochloric acid in a pressure cooker under conditions wherein 85 per cent of the starch was converted to dextrose. The crude dextrose liquor was then centrifuged, neutralized, adjusted to 10 Brix and subjected to a lactic acid fermentation as that described in Example 1. The fermented liquor was then subjected to a multistage vacuum concentration and carbon decolorization treatment. In the final vacuum concentration step the liquor was concentrated to 46 Bé. The liquor was then seeded with one per cent of crystalline dextrose and cooled to 130° F. It was then poured into slab molds and allowed to cool until the slabs solidified because of the crystallization of the dextrose.

The solidified mass was then broken up into chips. The resulting lactated solid dextrose sugar product contained 11 per cent moisture, 17 per cent lactic acid, 61 per cent dextrose, 9 per cent polysaccharide material, and 2 per cent of inorganic and protein materials.

If a higher lactic acid content is desired in the above type of solid sugar, this can be obtained by converting a larger portion of the sugar dry substance in the starch converted liquor. Since lactic acid is a liquid and has plasticizing qualities, an excessive amount of lactic acid would prevent the solidification of the dextrose. This can be avoided by adding a highly concentrated pure dextrose solution to the batch which is being processed for solidification into slabs of solid lactated dextrose.

If a purer, solid lactated dextrose product is desired, one may start with a pure aqueous dextrose solution, convert a part of the dextrose to lactic acid, and then dehydrate the mixture to a dextrose crystallizing Baumé.

By producing a solid slab or chip of a sugar-lactic acid product wherein the liquid lactic acid is encased in the solid sugar, the corrosive effects of the lactic acid are eliminated. With this type of product, it becomes possible to storage or transport lactic acid in ordinary containers instead of in containers having corrosion-resistant interior surfaces.

My solid sugar-lactic acid product is particularly useful in places where sugar and lactic acid are used together and wherein it is not necessary to use a white, crystalline sugar product. Thus, in such fields as the production of vinegar, pickled olives, pickled tomatoes, dill pickles and sour kraut, both lactic acid and sugar is used. In the past, the amount of lactic acid used in the said food industry applications was limited because of the high cost of the lactic acid. This made it necessary to replace lactic acid with acetic acid or other cheaper edible acids, even though the exclusive use of lactic acid would mean a food product of better quality. Because of the greatly simplified procedure, my sugar-lactic acid process is able to make available the lactic acid at a lower cost, thereby making it possible to increase the lactic acid proportion, with resultant improvements in food quality.

*Example 4*

Sugarcane juice was heated to 160° F. and subjected to a lime refining treatment in accordance with the usual cane-sugar refining art. The filtered cane juice from the liming treatment was adjusted to 10 Brix and then subjected to a lactic acid fermentation at 123° F. in accordance with the fermenting process described in Example 1, with the exception that the lime neutralization of the lactic acid was eliminated. In place of this, the fermentation was allowed to proceed until a lactic acid acidity of 2 per cent had developed. During the fermentation, the created lactic acid caused the inversion of the sucrose in the cane juice to a mixture of dextrose and levulose. The dilute, approximately 10 Brix liquor, was then vacuum concentrated to 30 Baumé, treated with filter cell and filtered, treated with decolorizing carbon and filtered, and finally vacuum concentrated to 42 Baumé.

The resulting 42 Baumé lactated syrup consisted of 18 per cent water, 16 per cent lactic acid, 30 per cent dextrose, 30 per cent levluose and 6 per cent of polysaccharide, nitrogenous and inorganic materials.

If products of higher purity are desired, one may either start with purer sucrose materials, or resort to a calcium lactate step as described in Example 1. Thus raw cane sugar containing 96 per cent sucrose, or commercial liquid invert sugar before pan concentration or invert molasses, before pan concentration could serve as starting materials. By using nitrogen salts or ammonia in place of protein for the fermenting nutrient, a finished lactated sugar product containing less impurities can be obtained.

Example 5

2500 pounds of a 7 Brix whey liquor containing 120 pounds of lactose and 20 pounds of milk protein was inoculated with a *L. bulgaricus* lactic acid culture and fermented for four days at 110° F. During this time the acidity was kept below 1.3 per cent by means of slaked lime. The batch was then heated to 190° F. to coagulate the protein, and decanted. The crude decanted calcium lactate liquor was treated with sulphuric acid to precipitate the calcium sulphate, and filtered.

The lactic acid liquor was then blended with a sufficient amount of 43 Bé. corn syrup to give a mixture containing 15 per cent of lactic acid on a dry basis. The mixed liquor was then refined by treatments with filter cell and decolorizing carbon. The refined, filtered liquor was then vacuum concentrated to 43 Bé.

By concentrating the dilute lactic acid solution obtained from the whey in the presence of concentrated corn syrup, the corrosive effects of the lactic acid are considerably inhibited and it is possible to use less expensive lactic acid liquor processing equipment.

By carrying out the dilute whey lactic acid fermentation adjacent to a corn syrup manufacturing process, one may decrease the lactic acid refining costs as well as handling costs by adding the batch of fermented whey liquor to a batch of neutralized acid-converted starch liquor and thereafter subjecting the resulting lactated sugar-liquor blend to the same refining process as that given to regular corn syrup manufacturing procedure. Similar advantageous results may be obtained by adding the fermented, dilute whey liquor to either a dilute cane sugar liquor or beet sugar liquor at a point before the several refining steps which are common to the sucrose refining art. The presence of lactic acid will cause the inversion of sucrose liquors and produce a finished syrup consisting of lactic acid, dextrose, levulose and some lactose.

My invention can be practiced in many alternative ways without departing from its fundamental principles. The partial lactating process may be applied to a wide variety of carbohydrates. Thus amylaceous materials, cellulose, pentosans, hemicellulose, dextrins and polysaccharide materials, such as Jerusalem artichokes, trioses, tetroses, or any other polymers of monoses may serve as a raw material base for the production of either a concentrated lactated syrup or a lactated solid solution of sugars.

The creation of lactic acid in the carbohydrate medium may be obtained by any of the numerous available lactic acid microorganisms known to the art, and each lactic microorganism has its own optimum activity conditions with reference to pH, temperature, Brix and converting time. The large variety of such microorganisms which is available makes it possible to practice my invention in a manner wherein one may choose a lactic microorganism which will exercise some selectivity over its carbohydrate substrate, thereby enabling one to manipulate the relative proportions of the individual sugars remaining in a syrup after the completion of the desired lactic acid fermentation.

Instead of the solid dextrose-lactic acid product described in this specification, one may, if one so desires, obtain similar mixtures of lactic acid encased in solid sugar from other sugars such as lactose or maltose. The specific sugar-refining steps or lactic acid fermentation procedure is not limited to those described in the examples of this specification. Many variations in the art of sugar refining and in the art of lactic acid fermentation can be applied without departing from the basic principles of this invention, namely, the production of a low moisture sugar product containing a substantial amount of lactic acid. The practice of this invention is not limited to lactic acid obtained from sugar by fermentation, nor to lactic acid per se. A low moisture sugar product containing an edible, water miscible, acid such as acetic or phosphoric acids is within the broad scope of my invention.

It is understood that I do not wish to be limited by the description forming a part of this specification, but desire to avail myself of such changes as may fall within the spirit and scope of the appended claims.

I claim:

1. Process for obtaining a low moisture, lactated sugar syrup which comprises: fermenting a sugar solution of 5 to 15 Brix to a point wherein less than twenty per cent of the sugar is converted to lactic acid, subjecting the resulting solution mixture of sugar and lactic acid to a sugar refining operation consisting of defecation and carbon decolorization and concentrating the said solution mixture to a moisture content of less than twenty per cent.

2. Process for obtaining a lactated corn syrup which comprises: acid converting an aqueous starch liquor to a corn syrup reducing sugar content stage, neutralizing the resulting sugar liquor, centrifuging to remove suspended colloidal matter, cooling to a lactic acid fermenting temperature, inoculating the centrifuged liquor with lactic acid fermenting materials, fermenting until a minor portion of the sugars have been converted to lactic acid, subjecting the resulting solution mixture of carbohydrate and lactic acid to a sugar refining operation consisting of defecation and carbon decolorization, and concentrating the said solution mixture to a moisture content of less than twenty per cent.

3. Process for obtaining a lactated solid corn sugar product which comprises: acid hydrolyzing an aqueous starch liquor to a dry substance dextrose content stage of more than eighty per cent, neutralizing the resulting sugar liquor, centrifuging to remove suspended matter, cooling to a lactic acid fermenting temperature, inoculating the centrifuged liquor with lactic acid fermenting materials, fermenting until less than twenty per cent of the said dextrose has been converted to lactic acid, subjecting the resulting solution mixture of sugar and lactic acid to a sugar refining operation consisting of defecation and carbon decolorization, concentrating the refined solution to beyond 45 Bé., cooling the batch to about 130° F., seeding with crystalline dextrose, pouring the seeded batch into molds, and cooling to room temperature and allowing the lactated sugar mass to solidify.

References Cited in the file of this patent

UNITED STATES PATENTS

| | | |
|---|---|---|
| 2,179,203 | Stein | Nov. 7, 1939 |
| 2,438,326 | Schopmeyer | Mar. 23, 1948 |